(12) United States Patent
Metzger et al.

(10) Patent No.: US 11,733,585 B2
(45) Date of Patent: Aug. 22, 2023

(54) OPTICAL ARRANGEMENT FOR SPECTRALLY BROADENING LASER PULSES

(71) Applicant: TRUMPF Scientific Lasers GmbH + Co. KG, Unterfoehring (DE)

(72) Inventors: Thomas Metzger, Munich (DE); Sebastian Stark, Unterfoehring (DE)

(73) Assignee: TRUMPF SCIENTIFIC LASERS GMBH + CO. KG, Unterfoehring (DE)

( * ) Notice: Subject to any disclaimer, the term of this patent is extended or adjusted under 35 U.S.C. 154(b) by 0 days.

(21) Appl. No.: 17/580,669

(22) Filed: Jan. 21, 2022

(65) Prior Publication Data
US 2022/0137483 A1 May 5, 2022

Related U.S. Application Data

(63) Continuation of application No. PCT/EP2020/070990, filed on Jul. 24, 2020.

(30) Foreign Application Priority Data

Jul. 26, 2019 (DE) .................... 10 2019 211 176.9

(51) Int. Cl.
*G02F 1/35* (2006.01)
*H01S 3/00* (2006.01)

(52) U.S. Cl.
CPC .............. *G02F 1/3511* (2013.01); *G02F 1/35* (2013.01); *H01S 3/0057* (2013.01); *H01S 3/0092* (2013.01)

(58) Field of Classification Search
CPC ........ G02F 1/35; G02F 1/3511; H01S 3/0057; H01S 3/0092
See application file for complete search history.

(56) References Cited

U.S. PATENT DOCUMENTS

| 5,657,157 A | 8/1997 | Lang et al. |
| 7,688,493 B2 | 3/2010 | Resan et al. |
| 9,678,405 B2 | 6/2017 | Mironov et al. |

(Continued)

FOREIGN PATENT DOCUMENTS

| DE | 102014007159 A1 | 11/2015 |
| EP | 2933882 B1 | 11/2016 |

(Continued)

OTHER PUBLICATIONS

Jargot et al., "Self-compression in a multipass cell", Optics Letters vol. 43, No. 22, Nov. 15, 2018, pp. 5643-5646. (Year: 2018).*

(Continued)

*Primary Examiner* — Daniel Petkovsek
(74) *Attorney, Agent, or Firm* — Leydig, Voit & Mayer, Ltd.

(57) ABSTRACT

An optical arrangement spectrally broadens laser pulses for nonlinear pulse compression. The optical arrangement has: a broadening section that is configured to guide a laser pulse repeatedly through at least one nonlinear broadening element. The nonlinear broadening element has a dispersion property that is selected such that the dispersion property compensates any self-focusing of the laser pulse in the nonlinear broadening element.

17 Claims, 3 Drawing Sheets

(56) References Cited

U.S. PATENT DOCUMENTS

2011/0182306 A1* 7/2011 Hosseini ............ B23K 26/0624
359/257
2017/0125964 A1* 5/2017 Russbueldt ........... H01S 3/0092

FOREIGN PATENT DOCUMENTS

WO WO 2014107804 A1 7/2014
WO WO 2015173245 A1 11/2015

OTHER PUBLICATIONS

Rolland, et al., "Compression of High-Power Optical Pulses," *Journal of the Optical Society of America B* 5, 3, pp. 641-647, Mar. 1988, Optica Publishing Group, Washington DC, USA.

Lassonde, et al., "High Energy Femtosecond Pulse Compression," *Laser Physics Letters* 13, pp. 1-7, Dec. 2016, Astro Ltd., Saint John, Canada.

He, et al., "High-Efficiency Supercontinuum Generation in Solid Thin Plates at 0.1 TW Level," *Optics Letters* 42, 3, pp. 474-477, Feb. 1, 2017, Optica Publishing Group, Washington DC, USA.

Mourou, et al., "Single Cycle Thin Film Compressor Opening the Door to Zeptosecond—Exawatt Physics," *The European Physical Journal: Special Topics* 223, 6, pp. 1-7, Feb. 2014, Springer Science and Business Media, Berlin, Germany.

Weitenberg, et al., "Nonlinear Pulse Compression to Sub-40 fs at 4.5 μJ Pulse Energy by Multi-Pass-Cell Spectral Broadening," *IEEE Journal of Quantum Electronics* 53, 6, pp. 1-4, Dec. 2017, Institute of Electrical and Electronics Engineers, Piscataway, NJ, USA.

Mironov, et al., "Spatially-Uniform Temporal Recompression of Intense Femtosecond Optical Pulses," *The European Physical Journal: Special Topics* 223, 6, pp. 1175-1180, May 2014, Springer Science and Business Media, Berlin, Germany.

Grazuleviciute, et al., "Filamentation and Light Bullet Formation Dynamics in Solid-State Dielectric Media with Weak, Moderate and Strong Anomalous Group Velocity Dispersion," *Journal of Optics* 18, 2, pp. 1-8, Jan. 2016, IOP Publishing, Bristol, UK.

Mevel, et al., "Extracavity Compression Technique for High-Energy Femtosecond Pulses," *Journal of the Optical Society of America B* 20, 1, pp. 105-108, Jan. 2003, Optica Publishing Group, Washington DC, USA.

Mironov, et al., "Compression of Femtosecond Pulses with a Gaussian Temporal and Spatial Intensity Distribution," *Quantum Electronics* 43, 8, pp. 711-714, Aug. 2013, Kvantovaya Elektronika and Turpion Ltd, London, UK.

* cited by examiner

OPTICAL ARRANGEMENT FOR SPECTRALLY BROADENING LASER PULSES

CROSS REFERENCE TO RELATED APPLICATIONS

This application is a continuation of International Application No. PCT/EP2020/070990 (WO 2021/018779 A1), filed on Jul. 24, 2020, and claims benefit to German Patent Application No. DE 10 2019 211 176.9, filed on Jul. 26, 2019. The aforementioned applications are hereby incorporated by reference herein.

FIELD

The invention relates to an optical arrangement for spectrally broadening laser pulses, to a method for spectrally broadening a laser pulse, to a method for designing a nonlinear broadening element, and to a kit having such a nonlinear broadening element.

BACKGROUND

To shorten laser pulses temporally, frequently the method of nonlinear pulse compression is applied, wherein laser pulses are first spectrally broadened by self-phase modulation and are then temporally compressed. In order to spectrally broaden a laser pulse, the latter is sent through a nonlinear medium, wherein a Kerr nonlinearity occurs, that is to say a change in the refractive index $\Delta n = n_2 I$, with the intensity I and the nonlinear refractive index $n_2$. The intensity of the laser pulse has a temporal envelope I(t), as a result of which the phase of the pulse is quickly modulated temporally, according to $\Phi(t) = k_n \Delta n L = k_n n_2 I(t) L$, with the wavenumber $k_n$ and the propagation length L in the medium. New frequencies are generated according to the relationship $\omega = -\partial/\partial t \Phi(t)$. The spectrum of the laser pulse is thus continuously broadened during the propagation in the nonlinear medium. If dispersion is negligible, the pulse shape remains constant, the pulse is chirped. Next, the pulse can be temporally compressed by removing the chirp.

A problem here, as recognized by the present inventors, is that the self-phase modulation (SPM) always occurs in combination with self-focusing (SF). Self-focusing leads to a narrowing of the beam diameter, a lower beam quality and all the way to a complete collapse, in particular filamentation, of the laser pulse.

SUMMARY

In an embodiment, the present disclosure provides an optical arrangement that spectrally broadens laser pulses for nonlinear pulse compression. The optical arrangement has: a broadening section that is configured to guide a laser pulse repeatedly through at least one nonlinear broadening element. The nonlinear broadening element has a dispersion property that is selected such that the dispersion property compensates any self-focusing of the laser pulse in the nonlinear broadening element.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The present disclosure provides an optical arrangement for spectrally broadening laser pulses for nonlinear pulse compression, a method for spectrally broadening a laser pulse, a method for designing a nonlinear broadening element, and a kit having such a nonlinear broadening element, wherein the stated disadvantages do not occur.

In particular, an aspect of the present disclosure provides an optical arrangement for spectrally broadening laser pulses for nonlinear pulse compression, having a broadening section that is configured to guide a laser pulse repeatedly or multiple times through at least one nonlinear broadening element, wherein the nonlinear broadening element has a dispersion property that is selected such that the dispersion property compensates any self-focusing of the laser pulse in the nonlinear broadening element. This makes it possible in particular to achieve great spectral broadening and at the same time a compact construction, without reducing the beam quality due to self-focusing at least to a relevant degree. The beam diameter of the laser pulse can advantageously be kept constant, in particular collimated. Strong spectral broadening of the spectrum of the laser pulse is achieved in particular by the laser pulse passing multiple times through at least one nonlinear broadening element, which can also be realized in particular by the laser pulse passing through a plurality of nonlinear broadening elements, in particular nonlinear broadening elements that are embodied identically with respect to one another, wherein each nonlinear broadening element compensates the self-focusing occurring in it by way of its dispersion property, or wherein the self-focusing is compensated with every pass through the nonlinear broadening element. It is not necessary here for the laser pulse to pass multiple times through one of the nonlinear broadening elements, or through all nonlinear broadening elements, if a plurality of nonlinear broadening elements are provided. Rather, the laser pulse can also pass through each of the nonlinear broadening elements only once, if a plurality of nonlinear broadening elements are provided and the laser pulse passes through them.

A nonlinear broadening element is understood to mean an element, in particular an optical element or structural element, which comprises an optical nonlinear medium or consists of a nonlinear medium, in particular such that a Kerr nonlinearity occurs in the optical element or structural part as the laser pulse passes through the element or structural part, with the result that the laser pulse undergoes self-phase modulation and thus spectral broadening.

A dispersion property is in particular understood to mean a defocusing property of the nonlinear broadening element.

The nonlinear broadening element thus in particular has a defocusing property that is matched to the self-focusing occurring in the nonlinear broadening element in a manner such that the self-focusing is compensated by the defocusing property of the nonlinear broadening element. In this way, the beam remains at least nearly collimated.

The self-focusing being compensated by the dispersion property, in particular the defocusing property, means in particular that the self-focusing is offset by the dispersion property, in particular by the defocusing property, by at least 80% to at most 120%, preferably by at least 90% to at most 110%, preferably by at least 95% to at most 105%, preferably by at least 99% to at most 101%, preferably exactly, that is to say by 100%. A collapse, in particular filamentation, of the laser pulse is thus effectively prevented.

The at least one nonlinear broadening element is preferably configured to additionally compensate any self-focusing that the laser pulse undergoes in at least one medium, which is arranged in an environment of the nonlinear broadening element, or in which the nonlinear broadening element is arranged. The medium can be a gaseous, liquid, or solid medium, or even a plurality of media.

The optical arrangement, according to embodiments of the present disclosure advantageously capable of keeping the laser pulse at least nearly constantly, preferably constantly, collimated. Moreover, the optical arrangement is implementable so that it is space-saving, in particular small, cost-effective, and compact. The optical arrangement is easily scalable to higher pulse energies and medium outputs. In particular, it is applicable with laser pulses having a temporal extent of between one ps and a few 10 fs. It is possible to enhance the contrast by means of nonlinear ellipse rotation. The optical arrangement can be advantageously approximately free from optical losses in particular with a suitable anti-reflective coating on the at least one nonlinear broadening element.

According to a development of an embodiment of the invention, the broadening section is configured to guide the laser pulse a) multiple times through the at least one nonlinear broadening element, or b) once through a plurality of the nonlinear broadening elements, which are preferably spaced apart from one another. It is also possible that the nonlinear broadening elements directly adjoin one another. The repeated guidance of the laser pulse through the at least one nonlinear broadening element can thus be realized in particular by sending the same laser pulse multiple times through the at least one nonlinear broadening element or by guiding the laser pulse—in particular once—through a plurality of nonlinear broadening elements, wherein the nonlinear broadening elements are preferably spaced apart—in the propagation direction of the laser pulse—from one another. There is no absolute need for the laser pulse to pass through one and the same nonlinear broadening element multiple times, wherein such a refinement is, however, not ruled out either.

The optical arrangement can have in particular six, seven, eight, nine, ten, or more than ten nonlinear broadening elements.

If the optical arrangement has a plurality of nonlinear broadening elements, preferably each nonlinear broadening element of the plurality of nonlinear broadening elements has a dispersion property that is selected in each case such that this dispersion property compensates the self-focusing of the laser pulse in the respective nonlinear broadening element.

A suitable upper limit for the number of nonlinear broadening elements in the broadening section is, for example, ten, with the exact number depending in particular on the thickness of the nonlinear broadening element, measured in the propagation direction of the laser pulse. An addition of further broadening elements will not necessarily lead to further spectral broadening because the dispersion taking place in the material of the nonlinear broadening elements results in an increasing temporal broadening of the laser pulse, and thus, in a decrease of the instantaneous intensity, which ultimately stops the self-phase modulation. A suitable upper limit for the number of nonlinear broadening elements is of course also attained if the desired spectral broadening has been attained through self-phase modulation.

According to a development of an embodiment of the invention, the nonlinear broadening element has its dispersion property due to a concave shape of an end face of the nonlinear broadening element. This represents a particularly simple refinement of the nonlinear broadening element, including its dispersion property, which is easily and cost-effectively producible. An end face of the nonlinear broadening element is here in particular a surface through which the laser pulse, which travels through the broadening section, passes as intended, that is to say in particular a beam entrance surface or a beam exit surface of the nonlinear broadening element. The dispersion property is preferably due to a concave shape of the beam entrance surface and/or the beam exit surface, particularly preferably due to a concave shape of the beam entrance surface of the nonlinear broadening element. With very particular preference, only the beam entrance surface has a shape that is at least regionally concave, while at the same time the beam exit surface preferably has a planar geometry. The concave shape of the end face can be produced or introduced during the production of the nonlinear broadening element. However, it is also possible for the concave shape to be introduced into the end face or be produced on the end face at a later point, in particular by milling, preferably by means of a diamond milling tool, lapping, and/or polishing.

Alternatively or additionally, it is also possible for the nonlinear broadening element to have its dispersion property due to a holographic or grating-type structure that is arranged in particular on the beam-entrance side and/or beam-exit side. In this case, it is possible for the front sides of the nonlinear broadening element to be embodied to be planar. The holographic or grating-type structure can be embodied—in particular regionally, that is to say locally—in the volume of the nonlinear broadening element.

Alternatively or additionally, at least one front side of the nonlinear broadening element can also have the structure of a Fresnel lens or be embodied in the manner of a Fresnel lens in order to provide the dispersion property.

Alternatively or additionally, a nonlinear broadening element in the form of a film can also be stretched in order to provide the dispersion property.

According to a development of an embodiment of the invention, the end face of the nonlinear broadening element is matched to the spatial intensity profile of the laser pulse in the cross-sectional plane of the laser beam, in particular corresponds to the spatial profile of the laser pulse in the cross-sectional plane—possibly aside from a scaling factor—or is configured to be proportional to the intensity profile. The shape of the end face is thus in particular matched to a specific intensity profile of the laser pulse with which the nonlinear broadening element is used as intended. This allows the local dispersion, in particular defocusing, to be matched to the local intensity, wherein in particular such regions of the laser profile in which strong self-focusing is expected to occur owing to the high intensity are more extensively dispersed, in particular defocused, than such regions, in particular peripheral regions, of the intensity profile in which only low self-focusing or even no self-focusing at all is expected to occur owing to a lower intensity. In this way, the self-focusing of the laser pulse can be reduced or even prevented in a particularly advantageous manner and in particular without additional spatial broadening of the laser beam in such regions of the profile in which low or no self-focusing occurs. Consequently, a particularly high beam quality is preferably generated or maintained.

In a particularly preferred embodiment, the end face of the nonlinear broadening element has a Gaussian shape. In particular, it may have a Gaussian profile, with particular preference the Gaussian profile of a laser pulse for whose spectral broadening the nonlinear broadening element is provided as intended and to whose intensity profile it is correspondingly matched. In particular, tails of the intensity profile may be defocused less extensively than central regions, and therefore the dispersion property of the nonlinear broadening element is matched to the local intensity levels and thus the local self-focusing properties of the laser pulse in the nonlinear broadening element.

According to a development of an embodiment of the invention, the at least one nonlinear broadening element is arranged in a vacuum. The optical arrangement, in particular the broadening section, can thus be at least regionally evacuated. This advantageously allows the suppression of disturbing influences of a gaseous medium. The beam guidance is typically already regionally arranged in a vacuum, and likewise arranging the at least one nonlinear broadening element in a vacuum therefore represents a particularly simple refinement in this case.

Alternatively, the at least one nonlinear broadening element may preferably be arranged in a gaseous or liquid medium. In this way, the optical arrangement, in particular the broadening section, can have a technically simpler and more cost-effective configuration than when it is at least regionally evacuated. The gaseous medium can be, in particular, air, an inert gas such as nitrogen or carbon dioxide, or a noble gas, or a mixture of at least two of the gases mentioned above. It is also possible for a solid medium, such as a glass body, to be arranged between two nonlinear broadening elements.

According to a development of an embodiment of the invention, the optical arrangement has a plurality of broadening sections, wherein a pulse compression device (pulse compressor) for temporally compressing the laser pulse is arranged between in each case two broadening sections. This corresponds to a cascading of the optical arrangement, in particular cascading of the broadening section, wherein in each case the at least one nonlinear broadening element of an individual broadening section generates a broadened spectrum that is then compressed using a pulse compression device into a temporally shorter laser pulse, which is then in turn spectrally broadened using the following broadening section and then compressed again, with this being able to be continued multiple times, basically ad infinitum. In this way, particularly short laser pulses can be obtained. This makes it possible to circumvent the inherent restriction resulting from the fact that, after multiple passes through nonlinear broadening elements, the temporal pulse duration of the laser pulse has become so long due to dispersion that no further self-phase modulation occurs. The interconnected pulse compression results in a temporal shortening of the laser pulse, and self-phase modulation therefore also occurs in the downstream broadening section.

The pulse compression device can have at least one chirped mirror, at least one grating, or at least one other suitable dispersive element, in particular a combination of at least two of the elements.

According to a development of an embodiment of the invention, the at least one nonlinear broadening element is embodied in the form of a plate-type element, in particular as a small plate, or as a film. This represents a particularly compact, simple, and cost-effective refinement of the nonlinear broadening element. In a preferred refinement, the nonlinear broadening element may preferably be embodied in the form of a small glass plate, small crystal plate, or small composite plate made of different materials, preferably sintered. The nonlinear broadening element can preferably comprise fused silica or consist of fused silica.

According to a development of an embodiment of the invention, the at least one nonlinear broadening element has a thickness of at least 2 mm, preferably of at least 10 mm to at most 50 mm, preferably of at least 15 mm to at most 40 mm, in the beam propagation direction of the laser pulse, i.e., in the propagation direction. In this way, the optical arrangement can be configured to be highly compact. The concave shape of the end face of the at least one nonlinear broadening element preferably has an extent in the beam propagation direction, i.e., in the propagation direction, of at least 1 $\mu$m to at most 100 $\mu$m, preferably of at least 10 $\mu$m to at most 40 $\mu$m, preferably of at least 15 $\mu$m to at most 30 $\mu$m, preferably of 20 $\mu$m. The extent of the concave shape is here preferably measured from an outermost point of the end face up to a minimum of the concave shape, for example in particular starting from an outermost tail of a Gaussian profile up to the maximum of the Gaussian profile, which at the same time corresponds to the minimum of the Gaussian well as the concave shape. The extent of the concave shape of the end face is at any rate preferably much smaller than corresponds to the thickness of the nonlinear broadening element in the beam propagation direction.

In particular, the dispersion property of the nonlinear broadening element preferably has a large negative focal length, in particular of several meters, in particular of several 10 meters, for example of 20 m or 22 m. The dispersion property, in particular the defocusing property, of the nonlinear broadening element is thus not very pronounced and selected to be just right so that the self-focusing of the laser pulse in the nonlinear broadening element is compensated. Beyond this, the nonlinear broadening element preferably does not have any defocusing or focusing properties, in particular no lens properties.

An aspect of the present disclosure provides a method for spectrally broadening a laser pulse for nonlinear pulse compression, wherein a laser pulse is guided repeatedly or multiple times through at least one nonlinear broadening element. The nonlinear broadening element in this case has a dispersion property that is selected such that the dispersion property compensates any self-focusing of the laser pulse in the nonlinear broadening element. This in turn means that, as part of the method, the self-focusing occurring in the nonlinear broadening element is compensated by the dispersion property of the nonlinear broadening element. As part of the method, in particular the advantages that have already been explained in conjunction with the optical arrangement are attained. In particular, an optical arrangement according to an embodiment of the invention or an optical arrangement according to one of the previously described exemplary embodiments is preferably used as part of the method.

The laser pulse can preferably be temporarily broadened by a chirp, that is to say can be practically pre-chirped, before it is guided through the at least one nonlinear broadening element.

The laser pulse being guided repeatedly through the at least one nonlinear broadening element in particular includes the case of the laser pulse either being guided multiple times through the at least one nonlinear broadening element or of it being guided once through a plurality of—preferably spaced apart from one another or immediately adjoining—nonlinear broadening elements. It is not absolutely necessary here for the laser beam to pass through one and the same nonlinear broadening element multiple times. However, such a refinement is possible. According to a preferred refinement, the laser pulse can pass through the at least one nonlinear broadening element in a double-pass process if the nonlinear broadening element is reflectively coated on its preferably planar rear side facing away from the beam.

An aspect of the present disclosure provides a method for designing a nonlinear broadening element for use in an optical arrangement according to an embodiment of the invention or an optical arrangement according to one of the previously described exemplary embodiments, or for use in a method for spectrally broadening a laser pulse according to an embodiment of the invention or an embodiment of the method for spectrally broadening the laser pulse. For a specific laser pulse, a thickness is defined for the nonlinear broadening element. The thickness of the nonlinear broadening element is in particular its extent in the propagation direction of the laser pulse, i.e., in the propagation direction. The self-focusing in the nonlinear broadening element, which has the defined thickness, is ascertained, in particular computed or simulated, or experimentally determined, for the specific laser pulse. A dispersion property is determined for the nonlinear broadening element such that the dispersion property compensates the self-focusing of the laser pulse in the nonlinear broadening element. The dispersion property that is thus determined is formed on the nonlinear broadening element. In this way, in particular a nonlinear broadening element that is suitable and configured for use in a corresponding optical arrangement or a corresponding method for spectral broadening is obtained.

When designing the at least one nonlinear broadening element, additionally any self-focusing that the laser pulse undergoes in at least one medium which is arranged as intended in an environment of the nonlinear broadening element, or in which the nonlinear broadening element is arranged as intended, is preferably taken into account. The medium can be a gaseous, liquid, or solid medium, or even a plurality of media. This self-focusing is preferably additionally compensated using the correspondingly designed nonlinear broadening element.

Designing the nonlinear broadening element is in particular understood to mean defining the configuration, in particular the spatial-geometric configuration, of the nonlinear broadening element.

A specific laser pulse is here understood to mean in particular a laser pulse that is defined in terms of its parameters, in particular in terms of its wavelength or the spectral composition, its spatial intensity profile in the cross-sectional plane perpendicular to the propagation direction, its temporal intensity profile, i.e., the temporal envelope of the intensity profile I(t), and/or its temporal pulse width, the pulse power, and/or the pulse energy.

The dispersion property for the nonlinear broadening element is preferably determined by computation, with particular preference by simulation. However, experimental determination is also possible.

The dispersion property is formed on the nonlinear broadening element preferably by the cutting machining of at least one end face of the nonlinear broadening element, in particular by milling, in particular by milling using a diamond tool, and/or by lapping and/or polishing. Alternatively or additionally, it is also possible, however, for the dispersion property to be introduced or produced during the production of the nonlinear broadening element, for example by way of a corresponding shaping process during molding or by pressing.

According to a development of an embodiment of the invention, the dispersion property is formed as a concave shape on an end face of the nonlinear broadening element. In particular, the shape of the end face may preferably be matched to the spatial intensity profile of the laser pulse in the cross-sectional plane perpendicular to the propagation direction; in particular, the shape is selected according to the spatial intensity profile. With particular preference, the dispersion property has a Gaussian shape on the end face of the nonlinear broadening element, in particular if the laser pulse is a fundamental-mode pulse (TEM00 or diffraction-limited pulse).

In a preferred embodiment of the method, the extent of the dispersion property, in particular of the concave shape, of the end face of the broadening element in the beam propagation direction is limited to at least 5 μm. This advantageously makes simple and cost-effective manufacturing of the broadening element possible. Moreover, the thickness of the broadening element in the beam propagation direction is preferably limited to at most 50 mm. The thickness of the broadening element and the extent of the dispersion property are preferably matched to one another and to a specific laser beam used with the broadening element such that the minimum extent of the dispersion property is not undershot. If the thickness of the matched broadening element exceeds the maximum thickness—for example owing to a low energy and/or a large beam diameter of the specific laser beam—for a specific laser beam used with the broadening element, a thickness for at least one additional AR-coated, i.e., anti-reflectively coated, element is preferably defined, or a number of additional AR-coated elements of specific thickness is correspondingly defined, wherein the thickness of the at least one additional AR-coated element or a sum of the thicknesses of the number of additional AR-coated elements is ascertained as a difference of the ascertained thickness of the broadening element and the maximum thickness of the broadening element.

According to a development of an embodiment of the invention, the dispersion property is matched to the intensity profile of the specific laser pulse. In particular, the dispersion property is selected according to the intensity profile, in particular proportionally to the intensity profile or identically to the intensity profile, of the specific laser pulse.

An aspect of the present disclosure provides a kit, wherein the kit has a nonlinear broadening element having a dispersion property that is matched to a specific laser pulse such that the dispersion property compensates any self-focusing of the specific laser pulse in the nonlinear broadening element. The kit additionally has usage information, which comprises at least one instruction for using the nonlinear broadening element with the specific laser pulse. In particular, the matching of the dispersion property to the properties of the specific laser pulse is manifested in the usage information. The user of the kit, in particular of the nonlinear broadening element, is thus informed by the usage information that the nonlinear broadening element should be used with the specific laser pulse that is defined in particular by the above-stated properties.

In one exemplary embodiment of the kit, the dispersion property, in particular the concave shape, of the broadening element has a minimum extent of 5 µm in the beam propagation direction. The broadening element preferably has a maximum thickness of 50 mm. The kit additionally has at least one AR-coated element of a specific thickness and without a dispersion property. In particular, the at least one AR-coated element without dispersion property can be used to increase the self-focusing of the laser pulse if the dispersion property of the broadening element having a minimum extent is too pronounced for a specific laser beam, based on the maximum thickness of the broadening element and the resulting self-focusing.

According to a development of an embodiment of the invention, the nonlinear broadening element of the kit has a dispersion property that is matched to the intensity profile of the specific laser pulse in the cross-sectional plane perpendicular to the propagation direction of the laser pulse. In particular, the dispersion property is proportional to the intensity profile or identical to the intensity profile.

In particular, the kit has a nonlinear broadening element, as was described previously in conjunction with the optical arrangement.

In connection with the kit, in particular the advantages that have already been mentioned in conjunction with the optical arrangement, the method for spectral broadening, and the method for designing the nonlinear broadening element transpire.

Figure 1A:
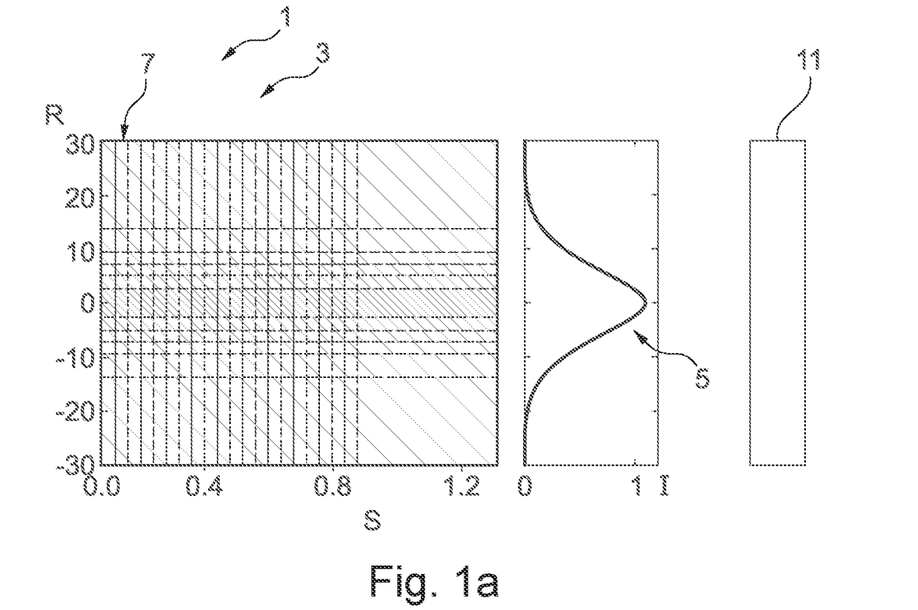
FIGS. 1a and 1b show a schematic illustration of an exemplary embodiment of an optical arrangement for spectrally broadening laser pulses and the effect thereof on the spectrum of a laser pulse.
Figure 1B:
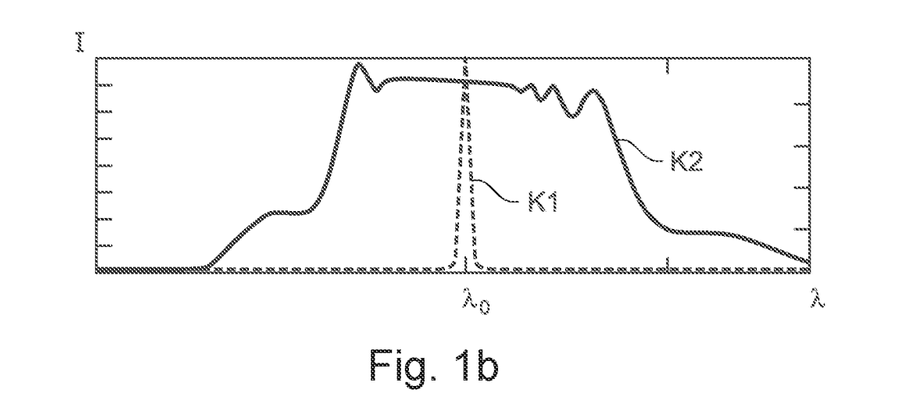

FIGS. 1a and 1b show a schematic illustration of an exemplary embodiment of an optical arrangement 1 for spectrally broadening laser pulses for nonlinear pulse compression. Here, FIG. 1a) shows the optical arrangement 1 having a broadening section 3, which is configured to guide a schematically illustrated laser pulse 5 repeatedly or multiple times through at least one nonlinear broadening element 7. In the exemplary embodiment illustrated here, the broadening section 3 has ten nonlinear broadening elements 7, of which only the first nonlinear broadening element 7 in the propagation direction of the laser pulse 5, that is to say viewed from left to right, is denoted with the corresponding reference sign for the sake of clarity. The nonlinear broadening elements 7 are here each schematically illustrated by a respective solid vertical line on the left-hand side and a dashed line on the right-hand side, representing the boundaries of the respective nonlinear broadening elements 7 in the propagation direction. This clearly shows that the ten nonlinear broadening elements 7 are spaced apart from one another.

In FIG. 1a), the radius R of the laser pulse 5 is also plotted against the propagation distance s. Furthermore, the right-hand part of the diagram in FIG. 1a) shows the intensity profile I of the laser pulse 5 in the plane perpendicular to the propagation direction, that is to say as a function of the radius R. This shows that the laser pulse 5 in this case has a Gaussian intensity profile.

FIG. 1b) illustrates that the spectrum of the laser pulse 5 is broadened as the latter passes through the broadening section 3. The intensity I of the laser pulse 5 is plotted here against the wavelength λ. A dashed, first curve K1 illustrates the spectrum of the laser pulse 5 before the latter passes through the broadening section 3, that is to say before it enters the first nonlinear broadening element 7, wherein this spectrum is concentrated comparatively narrowly around a central wavelength $\lambda_0$. The spectrum of the laser pulse 5 after the latter passes through the broadening section 3 is illustrated by a second, solid curve K2, wherein it becomes clear that the spectrum of the laser pulse 5 is significantly broadened by passing through the nonlinear broadening elements 7.

This is based on the self-phase modulation of the laser pulse 5 due to a Kerr nonlinearity when passing through the nonlinear medium of the broadening elements 7.

Figure 2A:
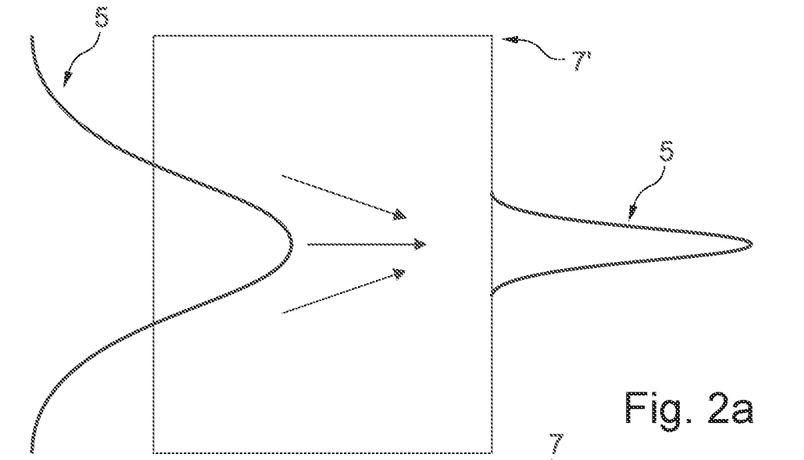
FIGS. 2a and 2b show a schematic illustration of the functioning principle of a nonlinear broadening element of the optical arrangement.
Figure 2B:
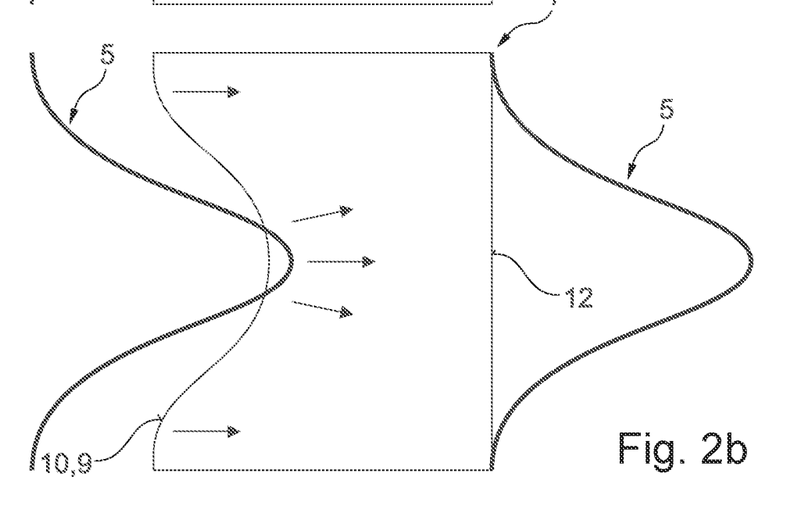

FIGS. 2a and 2b show a schematic illustration of the functioning of the optical arrangement 1.

Elements that are the same or functionally the same are provided with the same reference signs in all the figures, and so reference is respectively made to the above description.

In FIG. 2a), a conventional nonlinear broadening element 7' is shown schematically. When the laser pulse 5 passes through the conventional broadening element 7', it undergoes not just self-phase modulation, but also uncorrected self-focusing, as a result of which the radial intensity profile becomes narrower. If it passes in particular through a plurality of nonlinear broadening elements 7', or it passes through a correspondingly thick nonlinear broadening element 7', that is to say one that is extended in the propagation direction, this can result in an instability of the laser pulse 5 and ultimately to its complete collapse, in particular to filamentation.

To avoid this, the nonlinear broadening element 7 according to the invention, which is illustrated in one exemplary embodiment in FIG. 2b), has a dispersion property that is selected such that the dispersion property compensates and thus corrects the self-focusing of the laser pulse 5 in the nonlinear broadening element 7. In particular, preferably each nonlinear broadening element 7 of the broadening section 3 has a corresponding dispersion property.

In the exemplary embodiment illustrated in FIG. 2b), the dispersion property is formed by a concave shape of an end face 9, in this case specifically the beam entrance surface 10, of the nonlinear broadening element 7. Additionally or alternatively, a beam exit surface 12 can also have a corresponding concave shape.

The dispersion property, here in particular the concave shape of the end face 9, is preferably matched to the intensity profile of the laser pulse 5. In particular, the end face 9 has a Gaussian shape. Consequently, the center of the laser pulse 5, which has a high intensity, is more strongly defocused than the radially outer tails of the intensity profile, wherein, due to the nonlinear broadening element 7, the intensity profile of the laser pulse 5 ultimately remains at least substantially unchanged because the self-focusing effect of the nonlinear medium and the defocusing property of the nonlinear broadening element 7, in particular due to the concave shape of the end face 9, at least substantially cancel each other out, or the self-focusing is pre-compensated by the concave shape of the end face 9.

The nonlinear broadening element 7 preferably has a thickness of at least 2 mm, preferably of at least 10 mm to at most 50 mm, preferably of at least 15 mm to at most 40 mm, viewed in the beam propagation direction of the laser pulse. The concave shape of the end face 9 preferably has an extent in the beam propagation direction of at least 1 µm to at most 100 µm, preferably of at least 10 µm to at most 40 µm, preferably of at least 15 µm to at most 30 µm, preferably of 20 µm.

Figure 3A:
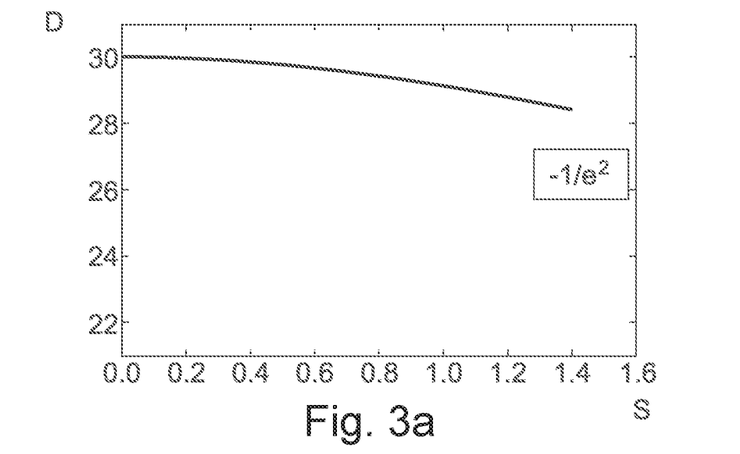
FIGS. 3a and 3b show a schematic illustration of an effect of the optical arrangement.

FIGS. 3a and 3b show a schematic diagram of the effect of the nonlinear broadening elements 7 according to the invention in comparison with conventional broadening elements 7'. Here, FIG. 3a) shows a profile of the diameter D of the laser pulse 5 at the height of the fraction $1/e^2$ of the peak intensity plotted against the propagation distance s for a plurality of conventional nonlinear broadening elements 7', which are—analogously to the construction of FIG. 1a)—arranged one behind another. This shows that the diameter D decreases with the continuing propagation due to the self-focusing.

Figure 3B:
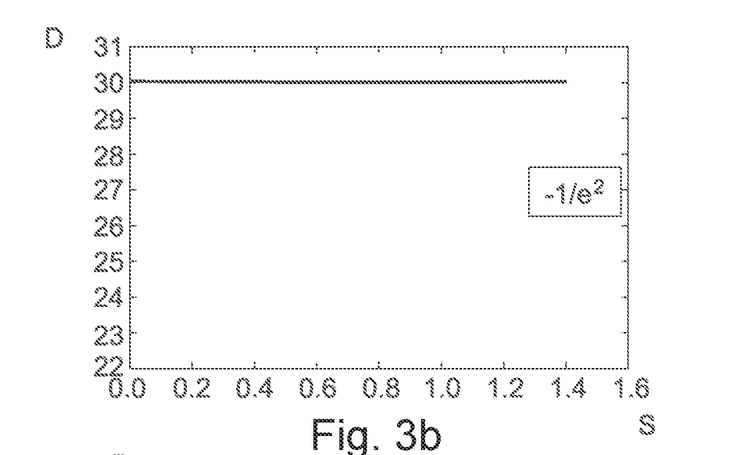

In FIG. 3b), the same plot is illustrated for an arrangement of nonlinear broadening elements 7 according to the invention in the construction according to FIG. 1a). It shows that the diameter D remains at least substantially constant along the propagation distance.

Returning to FIG. 1a), it should also be noted that the broadening section 3 is preferably configured to guide the laser pulse 5 multiple times through the at least one nonlinear broadening element 7, or alternatively—as illustrated in FIG. 1a)—once through a plurality of the nonlinear broadening elements 7, which are arranged in this preferred refinement at a distance from one another.

The nonlinear broadening elements 7 can be arranged in a vacuum or in a gaseous or liquid medium, in particular air, nitrogen, carbon dioxide, or at least one noble gas. A solid medium can also be arranged between the nonlinear broadening elements 7.

The arrangement illustrated in FIG. 1 can also be cascaded, wherein it can have a plurality of broadening sections 3, wherein a pulse compression device 11 (pulse compressor) for temporally compressing the laser pulse 5 can be arranged between in each case two broadening sections.

The nonlinear broadening elements 7 are preferably embodied in the form of plate-type elements, in particular of small glass plates or small crystal plates, or in the form of films.

The nonlinear broadening element 7 is preferably designed by defining, for a specific laser pulse, a thickness—measured in the propagation direction—for the nonlinear broadening element 7, wherein, for the specific laser pulse 5, any self-focusing in the nonlinear broadening element 7 having the defined thickness is determined, in particular computed, wherein a dispersion property for the nonlinear broadening element 7 is determined such that the dispersion property compensates the self-focusing of the specific laser pulse 5 in the nonlinear broadening element 7. The dispersion property is determined here in particular by simulation or experimentally. Finally, the dispersion property is formed on the nonlinear broadening element 7. Hereby, the nonlinear broadening element 7 is ultimately obtained.

Figure 4:
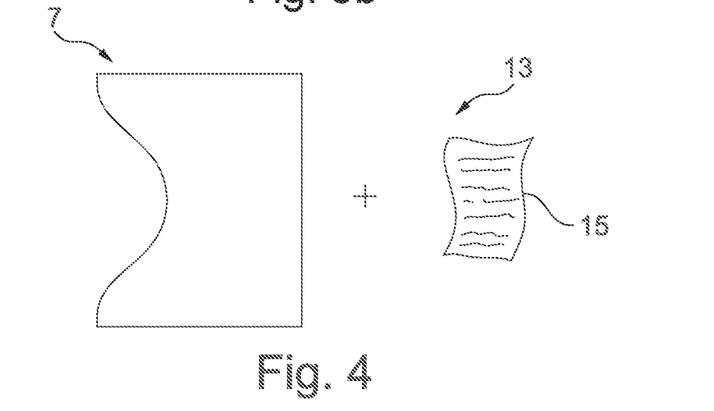
FIG. 4 shows a schematic illustration of an exemplary embodiment of a kit having a nonlinear broadening element.

FIG. 4 shows a schematic illustration of an exemplary embodiment of a kit 13. The latter comprises a nonlinear broadening element 7, which has a dispersion property that is matched to a specific laser pulse 5 in a manner such that the dispersion property compensates the self-focusing of the specific laser pulse 5 in the nonlinear broadening element 7. Furthermore, the kit 13 comprises usage information 15, which for its part comprises at least one instruction for using the nonlinear broadening element 7 with the specific laser pulse 5.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optical arrangement for spectrally broadening laser pulses for nonlinear pulse compression, the optical arrangement comprising:
    a broadening section that is configured to guide a laser pulse repeatedly through at least one nonlinear broadening element, wherein the at least one nonlinear broadening element has a dispersion property that is selected such that the dispersion property compensates any self-focusing of the laser pulse in the nonlinear broadening element, wherein an end face of the at least one nonlinear broadening element has a concave shape, and wherein the dispersion property is provided by the concave shape of the end face.

2. The optical arrangement as claimed in claim 1, wherein the broadening section is configured to guide the laser pulse:
    a) multiple times through the at least one nonlinear broadening element, or
    b) once through a plurality of nonlinear broadening elements, which comprise the at least one nonlinear broadening element.

3. The optical arrangement as claimed in claim 1, wherein the end face of the at least one nonlinear broadening element has a Gaussian shape.

4. The optical arrangement as claimed in claim 1, wherein the at least one nonlinear broadening element is arranged in a vacuum, or in a gaseous or liquid medium.

5. The optical arrangement as claimed in claim 1, wherein the optical arrangement has a plurality of broadening sections, comprising the broadening section, wherein a pulse compressor configured to temporally compress the laser pulse is arranged between each of two broadening sections.

6. The optical arrangement as claimed in claim 1, wherein the at least one nonlinear broadening element is embodied in a form of a plate.

7. The optical arrangement as claimed in claim 6, wherein the plate comprises a glass plate, a crystal plate, or a film.

8. The optical arrangement as claimed in claim 1, wherein the at least one nonlinear broadening element has a thickness of at least 2 mm, in the beam propagation direction of the laser pulse.

9. The optical arrangement as claimed in claim 8, wherein the at least one nonlinear broadening element has the thickness of: at least 10 mm to at most 50 mm in the beam propagation direction of the laser pulse, and wherein the concave shape of the end face has an extent in the beam propagation direction of at least 1 μm to at most 100 μm.

10. The optical arrangement as claimed in claim 9, wherein the at least one nonlinear broadening element has the thickness of: at least 15 mm to at most 40 mm in the beam propagation direction of the laser pulse.

11. The optical arrangement as claimed in claim 9, wherein the concave shape of the end face has the extent in the beam propagation direction of at least 10 μm to at most 40 μm.

12. The optical arrangement as claimed in claim 9, wherein the concave shape of the end face has the extent in the beam propagation direction of at least 15 μm to at most 30 μm.

13. A kit comprising the at least one nonlinear broadening element for use in the optical arrangement as claimed in claim 1, wherein the kit additionally comprises usage information, which comprises at least one instruction for using the at least one nonlinear broadening element with the laser pulse.

14. The kit as claimed in claim 13, wherein the dispersion property of the at least one nonlinear broadening element is matched to an intensity profile of the laser pulse.

15. A method for spectrally broadening a laser pulse, the method comprising:
guiding the laser pulse repeatedly through at least one nonlinear broadening element, wherein the nonlinear broadening element has a dispersion property that is selected such that the dispersion property compensates any self-focusing of the laser pulse in the nonlinear broadening element, wherein the dispersion property is formed as a concave shape on an end face of the at least one nonlinear broadening element.

16. A method for designing a nonlinear broadening element for spectrally broadening laser pulses for nonlinear pulse compression, the method comprising:
defining, for a specific laser pulse, a thickness for the nonlinear broadening element,
ascertaining a self-focusing in the nonlinear broadening element with the defined thickness for the specific laser pulse,
determining a dispersion property for the nonlinear broadening element such that the dispersion property compensates the self-focusing of the specific laser pulse in the nonlinear broadening element, and
forming the determined dispersion property on the nonlinear broadening element, wherein an end face of the nonlinear broadening element has a concave shape, and wherein the dispersion property is provided by the concave shape of the end face.

17. The method as claimed in claim 16, wherein the dispersion property is matched to an intensity profile of the specific laser pulse.

* * * * *